United States Patent

Kitaori et al.

[11] Patent Number: 5,593,723
[45] Date of Patent: Jan. 14, 1997

[54] MAGNETIC RECORDING MEDIUM MANUFACTURING METHOD AND MANUFACTURING APPARATUS AND MAGNETIC RECORDING MEDIUM

[75] Inventors: Noriyuki Kitaori; Osamu Yoshida; Hirohide Mizunoya, all of Tochigi, Japan

[73] Assignee: KAO Corporation, Tokyo, Japan

[21] Appl. No.: 122,286

[22] Filed: Sep. 17, 1993

[30] Foreign Application Priority Data

Sep. 17, 1992 [JP] Japan ................................. 4-247922
Jul. 22, 1993 [JP] Japan ................................. 5-181501

[51] Int. Cl.⁶ .................................................. B05D 5/12
[52] U.S. Cl. ...................... 427/127; 427/128; 427/131; 427/132; 427/600; 204/192.2; 428/694 TP; 428/694 TR
[58] Field of Search ........................... 204/192.2, 192.31; 427/127, 131, 132, 44, 600, 128; 428/694 TP, 694 TR

[56] References Cited

U.S. PATENT DOCUMENTS 4,824,724  4/1989  Ueda ......................................... 428/336

FOREIGN PATENT DOCUMENTS 0440259   8/1991   European Pat. Off. .
60069821   8/1985   Japan .
60191435   9/1985   Japan .
61126633  10/1986   Japan .
89/05362   6/1989   WIPO .

OTHER PUBLICATIONS

Patent Abstract of Japan, vol. 10, No. 45 (P-430) 21 Feb. 1986 & JP-A-60 191 435 (Hitachi Maxell).
Patent Abstract of Japan, vol. 7, No. 57 (P-510) 28 Oct. 1986 & JP-A-61 126 633 (Matsushita Electric).
Patent Abstract of Japan, vol. 9, No. 207 (P-382) 24 Aug. 1985 & JP-A-60 069 821 (Hitachi Condenser).
Patent Abstract of Japan, vol. 7, No. 57 (P-181) 9 Mar. 1983 & JP-A-57 203 230 (Hitachi Maxell).

Primary Examiner—Leszek Kiliman

[57] ABSTRACT

The present invention is directed to methods and apparatus for preparing a magnetic recording medium having a non-magnetic substrate layer, a back-coat layer containing a metal or semi-metal which has been deposited in a vacuum on one surface of the substrate, a magnetic layer which has been deposited in a vacuum on the other surface of the substrate, and an optional top-coat layer which has been sprayed in a vacuum onto the magnetic layer. A quantity of oxygen is introduced during depositing of the back-coat layer to obtain a surface resistance of 5 to $10^5$ ohms.

18 Claims, 3 Drawing Sheets

FIG. 3

| 53 | top coat layer |
| 52 | magnetic layer |
| 51 | nonmagnetic support |
| 54 | back-coat layer |

PRIOR ART

MAGNETIC RECORDING MEDIUM MANUFACTURING METHOD AND MANUFACTURING APPARATUS AND MAGNETIC RECORDING MEDIUM

BACKGROUND OF THE INVENTION

Field of the Invention

The present invention relates to a magnetic recording medium manufacturing method, a magnetic recording medium manufacturing apparatus and a magnetic recording medium.

Description of the Related Art

A magnetic recording medium such as a magnetic tape may include the following two types: a conventional application-type tape fabricated by applying magnetic coating material, which is made by dispersing magnetic powder in a binder, to a film serving as a non-magnetic support; the other is a deposition-type tape fabricated by depositing metal on a film without any binder, in a vacuum.

The deposition-type tape is desirable for high-density recording because it does not contain binder in a magnetic layer, so that the density of the magnetic material can be increased.

FIG. 3 shows the main constitution of a deposition-type tape that is currently commercially available.

A non-magnetic support 51, e.g., a film, is made of PET (polyethylene terephthalate), polyimide or aramid. The film thickness is 2 to 50 µm.

A magnetic layer 52 is formed by depositing Co-Ni alloy (80%–20%) on the non-magnetic support 51 by a vacuum deposition method to have a thickness of 1,500 Å. An undercoat layer optionally may be formed between the non-magnetic support 51 and the magnetic layer 52 in order to improve the adhesive property of the magnetic layer 52.

A top-coat layer 53 is formed to protect the magnetic layer 52 and serve as a lubricant for the smooth contact with a recording reproducing head. The coating method may be either a gravure technique or a die-coating technique. Perfluoropolyether (e.g., FOMBLIN (trade name) produced by Montedison S.p.A.), which is a fluorine-containing lubricant, is used as the component for the top-coat layer.

A back-coat layer 54 is made of a coating material prepared by dispersing carbon black (grain diameter of 10 to 100 nm) in a binder (chloroethylene-, urethane-, or nitrocellulose-based binder alone or a mixture of them). The coating material is applied to the surface opposite to the deposition surface of the magnetic layer 52 of the non-magnetic support 51 by a gravure technique, a reverse technique or a die-coating technique, so that the thickness of carbon after drying is 0.4 to 1.0 µm.

The back-coat layer mainly has the following functions.

(1) To prevent dust from adhering to the tape because of the antistatic effect obtained by imparting an electrical conductivity to the layer.

(2) To stabilize the tape transport by controlling the surface property (friction coefficient).

(3) To prevent warpage by balancing the front and back of the magnetic layer in view of hardness and so on.

Conventionally, the back-coat layer is formed by applying a coating material which is made by dispersing carbon black in a binder. Function (1) is met by the conductivity of the carbon black; function (2) is met by controlling carbon black grain diameter and the method of application; and function (3) is met by controlling the binder and the application thickness.

However, the back-coat layer of a conventional, deposition-type tape is of the application type. Therefore, when applying the back-coat layer before vacuum-depositing the magnetic layer, degassing (gas generated from residual solvent in the coated layer from the back-coat layer) occurs in the vacuum system and the degree of vacuum is lowered. As a result, the deposition is not well performed.

Therefore, conventionally, after the magnetic layer is deposited in a vacuum, the tape is taken out into the air and the back-coat layer is coated.

However, this method involves a problem with air borne dusts adhering to the film and contaminating the magnetic layer in the step of applying the back-coat layer, increasing the number of dropouts found in the dropout inspection (inspection for detecting dropouts, which are dropouts of reproduced signals due to scratches of the tape surface or foreign matter adhering to the surface, wherein the magnetic tape is loaded in an inspection cassette deck and predetermined signals are recorded and reproduced simultaneously).

Moreover, the conventional method causes a problem, in that the electrical conductivity of the back-coat layer is lowered, and consequently the antistatic effect thereof is marred, because carbon is mixed with an organic binder.

The electric conductivity, as a resistance value (surface resistance), below $10^7$ Ω is applicable, and the value for a marketed 8-mm video tape is $10^6$ Ω. However, a higher conductivity (lower resistance value) is demanded for a back-coat layer using carbon black. The reason for this is that the electric conductivity of the back-coat layer is lower than that of a back-coat layer using a metal or semi-metal, because the carbon black must be provided with an organic binder, thereby lowering conductivity, while the metal or semi-metal is provided alone, without any organic binder.

As described above, although a fluorine-containing lubricant is frequently used for the top-coat layer of a metallic-thin-film-type magnetic recording medium, the fluorine-containing lubricant is partially decomposed at 200° C., and its vapor pressure is low. As a result, it is impossible to apply the fluorine-containing lubricant in a vacuum. Thus, the method of preparation of the top-coat layer is an important factor with respect to the productivity of the magnetic recording medium, because it requires separate coating line in the air.

JP-A 5431708 discloses that a magnetic recording medium can be produced by depositing a non-magnetic layer and a ferromagnetic layer on a substrate in vacuum, while the partial pressure of oxygen gas is being controlled. The non-magnetic layer is formed from Cr, Ti, Si or Sn. However, the "nonmagnetic layer" is an undercoat layer applied as an adhesive between the magnetic layer and the nonmagnetic substrate. This publication does not disclose a back-coat layer to be applied to the other surface of the nonmagnetic substrate.

JP-A 54-141111 discloses that a magnetic recording medium is produced by directing magnetic vapor, containing accelerated ions, onto a substrate passing through a cylindrical can in a vacuum. A suitable degree of vacuum is obtained by introducing oxygen gas from outside the can.

SUMMARY OF THE INVENTION

In consideration of the above disadvantages in the prior art, an object of the present invention is to provide a magnetic recording medium having excellent performance by solving the problems discussed above, including adhesion of dust, etc., during the forming of a back-coat layer on the surface opposite to the magnetic layer deposition surface of a non-magnetic support or during the forming of a top-coat layer on the magnetic layer. Another object of the present invention is to further improve the productivity of a metallic-thin-film-type magnetic recording medium.

The invention also provides a method for manufacturing a magnetic recording medium which comprises forming a first layer on a substrate in a vacuum and then forming a second layer in a vacuum on the substrate or the first layer. It is preferable that the first layer and the second layer are formed continuously or successively.

The invention also provides a method for manufacturing a magnetic recording medium which comprises forming a first layer on a substrate in a vacuum, then forming a second layer in a vacuum on the substrate or the first layer and then forming a third layer in a vacuum on the substrate, the first layer or the second layer. It is preferable that the first layer, the second layer and the third layer are formed continuously or successively.

More particularly, the present invention provides a method of manufacturing a magnetic recording medium having a magnetic layer disposed on a nonmagnetic substrate which comprises providing in a vacuum (a) a back-coat layer to said nonmagnetic substrate, or (b) a top-coat layer to said magnetic layer.

The invention also provides a method for manufacturing a magnetic recording medium which comprises forming, in a vacuum, a back-coat layer on a surface of a non-magnetic substrate and a magnetic layer on the other surface of the back-coat layer-formed surface. It is preferable that the back-coat layer and the magnetic layer are formed in a continuous vacuum.

The invention also provides a method for manufacturing a magnetic recording medium which comprises forming, in a vacuum, a back-coat layer on a surface of a non-magnetic substrate, a magnetic layer on the other surface of the back coat layer-formed surface and a top-coat layer on the magnetic layer. It is preferable that at least two of the back-coat layer, the magnetic layer, and the top-coat layer are continuously or successively formed. It is also preferable that the back-coat layer and the magnetic layer are respectively formed by being deposited in a vacuum and the top-coat layer is formed by spraying a lubricant in a vacuum. Preferably, the back-coat layer comprises aluminum oxide. Preferably, the magnetic layer comprises iron, a ferromagnetic alloy comprising iron as the main component, an iron nitride, an iron carbide, a nitride of a ferromagnetic alloy comprising iron as the main component, a carbide of a ferromagnetic alloy comprising iron as the main component, or mixtures thereof.

The invention also provides a method for manufacturing a magnetic recording medium which comprises forming a metal or semi-metal layer, in a vacuum, onto a surface other than the magnetic layer-deposited surface of a non-magnetic substrate to form a back-coat layer. It is preferable that the metal or semi-metal is deposited in a vacuum on the surface, while an oxidizing gas is introduced. The oxidizing gas may include oxygen gas, air, ozone gas, and mixtures thereof.

It is preferable that the back-coat layer, the top-coat layer and the magnetic layer are formed in a continuous vacuum; that the metal or semi-metal is deposited in a vacuum on the surface of a non-magnetic substrate while an oxidizing gas is introduced; that the back-coat layer is composed of aluminum oxide; and that the magnetic layer is composed of iron, a ferromagnetic alloy comprising iron as the main component, an iron nitride, an iron carbide, a nitride of a ferromagnetic alloy comprising iron as the main component, a carbide of a ferromagnetic alloy comprising iron as the main component, or mixtures thereof.

The invention also provides a method for forming a top-coat layer of a magnetic recording medium which comprises forming the top-coat layer on the magnetic layer-deposited surface of a non-magnetic substrate in a vacuum. It is preferable that the top-coat layer is formed in vacuum by spraying a lubricant on the magnetic layer; that the lubricant is a fluorine-containing lubricant; and that feeding means to feed the lubricant and the lubricant fed from said feeding means are exposed to ultrasonic waves to be atomized and the resulting lubricant is sprayed.

The invention also provides a method for manufacturing a magnetic recording medium comprising a non-magnetic substrate, a back-coat layer provided on a surface of the non-magnetic substrate, a magnetic layer provided on the other surface of the non-magnetic substrate and a top-coat layer provided on the magnetic layer, which comprises:

(1) driving and transporting the substrate in a vacuum, attaching a metal or a semi-metal on a surface of the substrate to form a back-coat layer, then attaching a magnetic substance on the other surface of the substrate to form a magnetic layer and then spraying a lubricant on the magnetic layer to form a top-coat layer;

(2) driving and transporting the substrate in a vacuum, attaching a magnetic substance on a surface of the substrate to form a magnetic layer, then spraying a lubricant on the magnetic layer to form a top-coat layer and then attaching a metal or a semi-metal on the other surface of the substrate to form a back-coat layer; or (3) driving and transporting the substrate in a vacuum, attaching a magnetic substance on a surface of the substrate to form a magnetic layer, then attaching a metal or a semi-metal on the other surface of the substrate to form a back-coat layer and then spraying a lubricant on the magnetic layer to form a top-coat layer.

The invention also provides an apparatus for manufacturing a magnetic recording medium comprising a housing provided with chambers and vacuum means for keeping each of said chambers in a vacuum. More particularly, said apparatus contains vacuum means for keeping all of said chambers in a continuous vacuum. Said chambers may contain means for introducing oxidizing gas, and lubricant spraying means.

The invention also provides an apparatus for manufacturing a magnetic recording medium comprising a housing provided with first, second, and third chambers and a vacuum means for maintaining each of the chambers in a vacuum; wherein the first, second and third chambers or the first, third and second chambers are adjacently arranged in this order, the adjacent chambers are made to communicate with each other through an opening for passing a non-magnetic support, the first chamber has a first cooling can for transporting the non-magnetic support and a first deposition means disposed under the first cooling can, the second chamber has a second cooling can for transporting the non-magnetic support and a second deposition means disposed under the second cooling can, and the third chamber has a heating can for transporting the non-magnetic support and a lubricant spray means disposed under the heating can.

The invention also provides a magnetic recording medium comprising a non-magnetic substrate, a back-coat layer formed in a vacuum from a metal, a semi-metal or an oxide thereof on a surface of the non-magnetic substrate, and a magnetic layer formed on a surface of the substrate other than the back-coat layer-deposited surface; a magnetic recording medium comprising a non-magnetic substrate, a back-coat layer formed in a vacuum from a metal, a semi-metal or an oxide thereof on a surface of the non-magnetic substrate, a magnetic layer formed on a surface of the substrate other than the back-coat layer-deposited surface, and a top-coat layer formed in a vacuum on the magnetic layer by spraying a lubricant; and a magnetic recording medium, comprising a non-magnetic substrate, a magnetic layer formed on a surface of the non-magnetic substrate and a top-coat layer formed in a vacuum on the magnetic layer by spraying a lubricant.

The scope and applicability of the present invention will become apparent from the description given hereinafter. However, it should be understood that the description and specific embodiments, while indicating preferred examples of the invention, are given by way of illustration only, since various changes and modifications within the spirit and scope of the invention will become apparent to those skilled in the art from this description.

BRIEF DESCRIPTION OF THE DRAWINGS

FIG. 3 is a partial view of a deposition-type tape.

Figure 1:
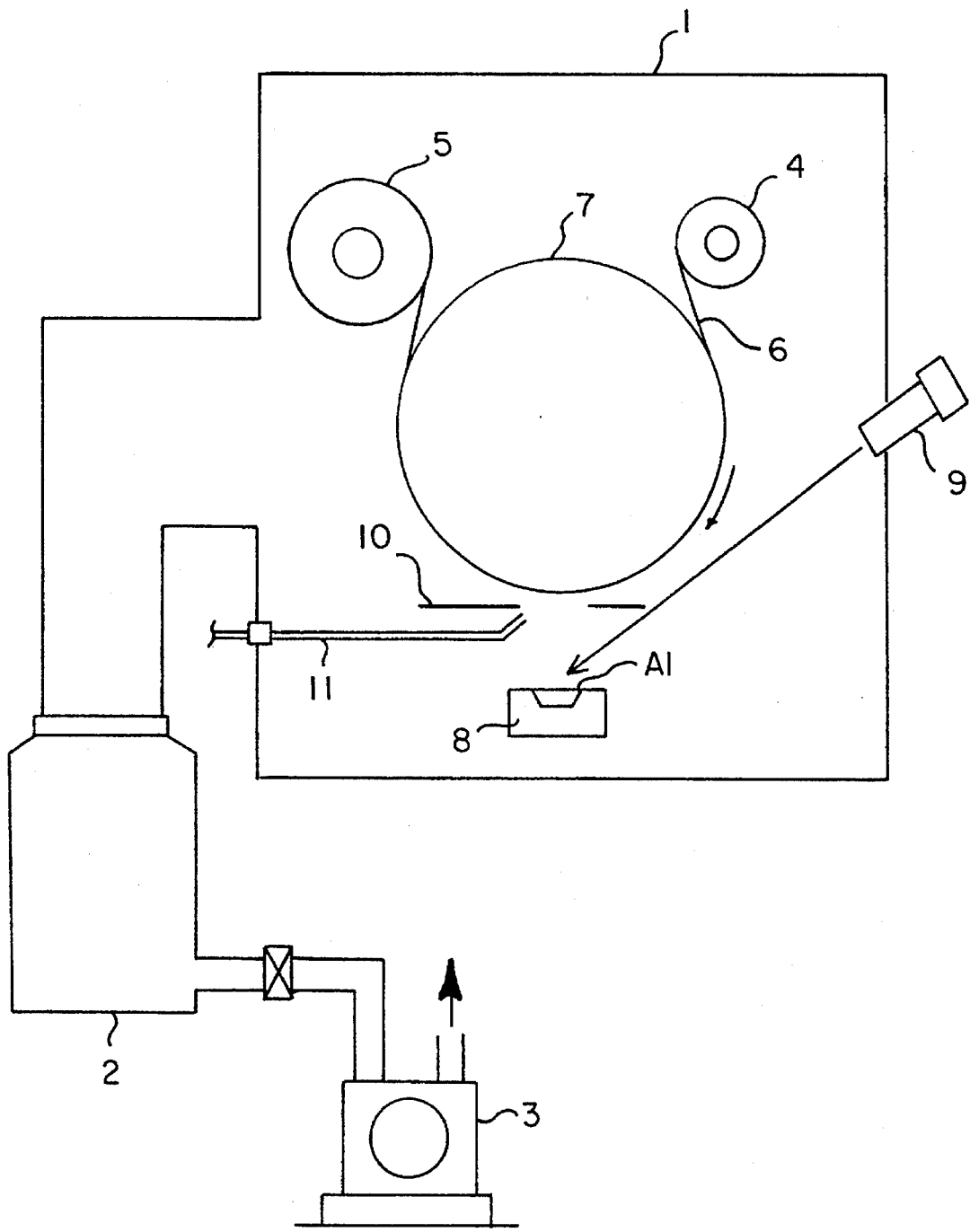
FIG. 1 is a schematic view of the vacuum evaporator used for an embodiment of a manufacturing method of the present invention.

The numerical references,

1: Vacuum vessel
4: Unwinding roll
5: Winding roll
6: Magnetic tape
7: Cooling can
8: Crucible
9: Electron beam gun
10: Shielding plate
11: Oxygen introduction tube
21: Housing
22: First chamber for forming back-coat layer
23: Second chamber for forming magnetic layer
24: Third chamber for forming top-coat layer
43: Ultrasonic atomizer
44: Spray nozzle

DETAILED DESCRIPTION OF THE PREFERRED EMBODIMENTS

The invention provides a method for manufacturing a magnetic recording medium which comprises depositing at least one metal or semi-metal on the surface opposite to the magnetic layer deposition surface of a non-magnetic substrate or support in a vacuum, while introducing oxygen or oxidizing gas in order to form a back-coat layer on the surface. The invention includes the three embodiments as described below.

The present invention provides a magnetic recording medium manufacturing method which comprises depositing a metal on the surface of a non-magnetic support opposite to the magnetic layer deposition surface while introducing oxygen in a vacuum in order to form a back-coat layer on the surface (hereinafter referred to as first manufacturing method).

It is preferable that the process of the invention can be advantageously carried out by conducting one step of providing of the magnetic layer, the back-coat layer and the top-coat layer continuously; any two, or all, of the magnetic layer, the back-coat layer and the top-coat layer can be provided continuously and subsequently to each other; or all or two of the magnetic layer, the back-coat layer and the top-coat layer can be conducted continuously and subsequently to each other in respect to a vacuum.

It is also preferable that the process of the invention can be advantageously carried out by conducting one step of providing of the magnetic layer, the back-coat layer and the top-coat layer intermittently; any two, or all, of the magnetic layer, the back-coat layer and the top-coat layer can be provided separately from, or independently of, each other; or any two, or all, of the magnetic layer, the back-coat layer and the top-coat layer can be provided separately from, or independently of, each other in respect to a vacuum. The above shown separated steps are conducted in view of site or with an interval in time.

The back-coat layer, according to the present invention, is formed by depositing metal by a vacuum deposition method. Thus, the problems associated with the prior art, including adhesion of dust, etc., do not occur when the back-coat layer is formed in a vacuum according to the claimed invention. It is thereby possible to continuously perform vacuum deposition of the magnetic layer and back-coat layer. It is also possible to perform vacuum deposition of the layers in separate steps, that is, it is possible to perform vacuum deposition of one layer and wind the layer on a roll, and then to perform vacuum deposition of the other layer while unwinding the tape already having one layer deposited thereon. When performing vacuum deposition of the layers in separate steps, the problems associated with the prior art, including adhesion of dust, etc., do not occur unless the layer is unwound from the roll in the air, even though the roll with the magnetic recording medium unwound is exposed to the air. In other words, only the unwound portion needs to be unexposed to the air.

When the back-coat layer is formed through a simple vacuum deposition, in other words, when it is left as metal on the tape, the transport stability is impaired because the surface is too smooth. Therefore, oxygen is introduced to roughen the surface during the deposition, in order to control the friction coefficient of the back-coat layer.

In this case, it is preferable to so set the quantity of oxygen to be introduced that the surface resistance (resistance value) of the back-coat layer is kept in a range of from 5 to $10^5$ $\Omega$, preferably about $10^2$ to $10^3$ $\Omega$.

That is, because the metallic bond can be weakened and the conductivity decreased by introducing oxygen, the resistance is determined by controlling the quantity of oxygen to be introduced.

The reason why the resistance is from 5 to $10^5$ $\Omega$ is that if the resistance is smaller than 5 $\Omega$, the quantity of oxygen is small and the coefficient of friction of the back-coat layer is too small. However, if the resistance is larger than $10^5$ $\Omega$, the friction coefficient extremely increases and the conductivity extremely decreases. This may cause adhesion of dust. The preferred range for resistance is about $10^2$ to $10^3$ $\Omega$. In this case, the center-line average roughness is Ra=8 to 20 nm.

Although there are various metals to be deposited as the back-coat layer, Al, Cu, Zn, Sn, Ni, Ag or alloys thereof are used. However, Al or Cu is the most preferred in view of the price, deposition rate, and stability after oxidation.

The thickness of the back-coat layer ranges from 0.2 to 1.0 μm. The degree of vacuum for the deposition to form the back-coat layer ranges from $10^{-4}$ to $10^{-7}$ Torr, preferably $10^{-5}$ to $10^{-6}$ Torr.

The second embodiment of the process for producing the magnetic recording medium according to the invention is to deposit a semi-metal and form a back-coat layer in a vacuum, while introducing oxygen gas (hereinafter, the second manufacturing method). The second procedure is substantially conducted in the same way as the first embodiment, except for using a semi-metal such as Si, Ge, As, Sc and Sb. Si is preferable in view of economics and evaporation rate. The amount of the oxygen gas fed may be preferably adjusted so that the back-coat layer may have a surface resistance in the range of $10^5$ to $10^8$ ohms.

Moreover, the present invention provides a magnetic recording medium manufacturing method which comprises transporting a nonmagnetic support in a vacuum, forming a metallic back-coat layer by vacuum-depositing a metal or a semi-metal on one surface of the nonmagnetic support while introducing oxygen, forming a magnetic layer through a vacuum deposition on the surface opposite to the surface where the metallic back-coat layer of the magnetic recording medium is formed, and forming a top-coat layer by spraying a lubricant on the magnetic layer (hereinafter referred to as the third manufacturing method).

The third manufacturing method of the present invention is characterized by continuously or successively forming a back-coat layer, a magnetic layer and a top-coat layer of a magnetic recording medium in a vacuum. Other steps, such as dust removal, smoothing, surface treatment, cutting, winding, and assembling of the magnetic layer, are performed by known methods.

Though metals and semi-metals to use for forming the back-coat layer of the third manufacturing method can be those described in the first and second manufacturing methods, it is especially preferable to evaporate Al by an electron beam and, at the same time, introduce oxygen gas into Al vapor through an oxygen gas introduction tube, and form the back-coat layer of a thin film of aluminum oxide. It is also desirable to so determine the quantity of oxygen to be introduced that the surface resistance of the back-coat layer of a metal is in a range of from 5 to $10^5$ Ω, preferably $10^2$ to $10^3$ Ω, or of a semi-metal, $10^5$ to $10^8$ Ω, preferably $10^6$ to $10^7$ Ω. The thickness of the back-coat layer ranges from 0.2 to 1.0 μm. The degree of vacuum for the deposition to form the back-coat layer ranges from $10^{-4}$ to $10^{-7}$ Torr, preferably $10^{-5}$ to $10^{-6}$ Torr.

In the third magnetic recording medium manufacturing method of the present invention, it is preferable to spray a lubricant on the magnetic layer formed on the nonmagnetic support by using an atomizer equipped with an ultrasonic wave generator (hereinafter referred to as an ultrasonic atomizer). By using the ultrasonic atomizer to spray a lubricant in the form of fine particles, it is possible to spray, in a vacuum, a fluorine-containing lubricant such as perfluoropolyether, whose vapor pressure is low, though such a fluorine-containing lubricant has been conventionally applied in the air to form a top-coat layer because the lubricant is unstable at high temperature, e.g., 200° C. or above.

Perfluoropolyether with a molecular weight of 2,000 to 5,000 is preferable. For example, marketed lubricants, "FOMBLIN Z DIAC" [modified with carboxyl groups, produced by Montecatini Edison S.p.A.] and "FOMBLIN Z DOL" [modified with an alcohol(s), produced by Montecatini Edison S.p.A.] are available. Because these products have a hydroxyl group or a carboxyl group at the end, the adhesion between the lubricant and magnetic layer is increased. Therefore, these lubricants are particularly preferable for the present invention.

In addition to the above lubricants, fluorine-containing lubricants comprising further benzene rings, double bonds and branched chains, fatty-acid-containing lubricants, and other lubricants can be used. However, the fluorine-containing lubricant is particularly preferably used for the present invention, because it improves not only durability but also corrosion resistance as compared with the fatty-acid-based lubricant.

To spray a lubricant, it is preferable to use a solution of 0.001 to 10 wt %, preferably 0.02 to 2.0 wt %, of the lubricant made by dissolving the lubricant in an adequate solvent such as a fluorine-containing inactive solvent (e.g., perfluorocarbon such as "Fluorinert" produced by Sumitomo 3M Ltd.), an aromatic-hydrocarbon type solvent such as toluene, an alcohol-type solvent or a ketone-type solvent. When using perfluoropolyether as a lubricant, perfluorocarbon can be used as a solvent. In this case, it is preferable that the solvent concentration is in a range of 0.001 to 1.0 wt %, preferably 0.05 to 0.2 wt %.

In the third manufacturing method of the present invention, it is desirable that the fine particles of the lubricant to be sprayed (lubricant solution) have a diameter as small as possible. Though the ultrasonic wave frequency to be applied is determined by the type and viscosity of the lubricant, it is generally selected from a range of 20 kHz to 10 MHz.

In the second manufacturing method of the present invention, it is possible to suitably determine the quantity of lubricant to be sprayed by considering the purpose of the magnetic recording medium and the type of the lubricant. However, it is preferable that the thickness of the formed top-coat layer is adjusted to be in the range of 50 to 200 Å. The degree of vacuum to spray the lubricant ranges from $5 \times 10^{-1}$ to $5 \times 10^{-4}$ Torr, preferably $10^{-1}$ to $10^{-2}$ Torr.

In the three manufacturing methods of the present invention, ferromagnetic metallic materials used for manufacturing a normal metallic-thin-film-type magnetic recording medium may be used for forming the magnetic layer. For example, ferromagnetic metal such as Co and Ni or ferromagnetic alloy such as Fe-Co, Fe-Ni, Co-Ni, Fe-Co-Ni, Fe-Rh, Fe-Cu, Co-Cu, Co-Au, Co-Y, Co-La, Co-Pr, Co-Gd, Co-Sm, Co-Pt, Ni-Cu, Mn-Bi, Mn-Sb, Mn-Al, Fe-Cr, Co-Cr, Ni-Cr, Fe-Co-Cr, Ni-Co-Cr, and mixtures thereof. More particularly, it is preferable to use a thin film of iron or a thin film of ferromagnetic alloy, containing mainly iron, for the magnetic layer. For example, iron nitride, iron carbide, or nitride or carbide of ferromagnetic alloy containing mainly iron.

For high-density recording, it is preferable to form the magnetic layer of a magnetic recording medium on a base material, e.g., a nonmagnetic substrate, by means of oblique deposition. The technique of oblique deposition is not restricted, and any known technique can be adopted. The degree of vacuum for deposition ranges from $10^{-4}$ to $10^{-7}$ Torr. The magnetic layer formed by deposition can be of a single layer structure or a multilayer structure. Particularly, the durability can be improved by forming an oxide on the magnetic layer surface by introducing oxygen gas or air.

According to the present invention, the magnetic layer can be formed in a single layer or a multilayer. To form a two-layer magnetic layer through deposition, it is preferable that the lower magnetic layer thickness is in the range of 100 to 2,000 Å and the upper magnetic layer thickness is in the range of 50 to 1,000 Å. To form a three-layer magnetic layer, it is preferable that the bottom magnetic layer thickness is in the range of 100 to 2,000 Å, the middle magnetic layer thickness is in the range of 100 to 1,000 Å, and the top magnetic layer thickness is in the range of 50 to 1,000 Å. A larger number of magnetic layers is better for high-frequency recording. Two to five layers may be adequate for practical use.

The nonmagnetic support of the present invention is made of a plastic. Suitable plastics include polyester, such as polyethylene terephthalate or polyethylene naphthalate; polyolefin, such as polyethylene or polypropylene; cellulose derivative such as cellulose triacetate or cellulose diacetate; polycarbonate; polyvinyl chloride; polyimide; and aromatic polyamide. The thickness of these nonmagnetic supports ranges from 3 to 50 μm.

Moreover, the present invention provides a magnetic recording medium manufacturing apparatus for manufacturing a magnetic recording medium made up of a nonmagnetic support and a magnetic layer formed on the support, comprising a housing provided with first, second and third chambers and vacuum means for keeping each of the chambers in a vacuum; wherein the first, second and third chambers are adjacently arranged in this order, and the adjacent chambers communicate with each other through an opening for passing the nonmagnetic support;

the first chamber has a first cooling can for transporting a nonmagnetic support, a first deposition means disposed under the first cooling can, and a first oxygen-gas introduction means for introducing oxygen gas during or after the deposition;

the second chamber has a second cooling can for transporting the nonmagnetic support, a second deposition means disposed under the second cooling can, and a second oxygen-gas introduction means for introducing oxygen gas during or after the deposition; and the third chamber has a heating can for transporting the nonmagnetic support and a lubricant spray means disposed under the heating can.

In the manufacturing apparatus of the present invention, a conventional device such as a vacuum pump is used as the vacuum means, and the chambers generally communicate through slits for passing the nonmagnetic support.

The manufacturing apparatus of the present invention makes it possible to starting forming either the magnetic layer and back-coat layer in the first and second chambers. Therefore, to form the magnetic layer in the first chamber, a magnetic metal, as mentioned before, is selected as the metallic material. For the process in the second chamber, a metal or semi-metal to form the back-coat layer previously mentioned is selected. If the reverse order of formation of the layers is desired, the metals are reversely selected for the first and second chambers.

In the case of the manufacturing apparatus of the present invention, each oxygen gas introduction means comprises an oxygen gas introduction tube and a proper opening. The manufacturing apparatus of the present invention is provided with transport rollers and a shielding plate for demarcating the inside of the chambers when necessary.

The following are embodiments of the manufacturing apparatus of the present invention but do not limit the scope thereof.

(1) In one embodiment of a magnetic recording medium manufacturing apparatus of the present invention, the first and/or second deposition means include (or includes) a metallic material vessel opening to the first or second cooling can and an electronic beam generator for applying an electron beam to a metallic material in the vessel.

(2) In another embodiment of a magnetic recording medium manufacturing apparatus of the present invention, the first or second chamber is further provided with a first nitrogen-ion supply means for supplying nitrogen ions or a mixture of nitrogen ion and nitrogen gas during the deposition. The nitrogen-ion supply means is installed in a chamber for forming a magnetic layer, nitrogen ions supplied from the nitrogen-ion supply means react with the vapor of a magnetic metal to produce metal nitride, and a magnetic layer of a thin film of the metal nitride is formed on a nonmagnetic support. The previously mentioned oxygen-gas introduction means is disposed in a position where the surface of the magnetic layer is oxidized.

(3) In another embodiment of a magnetic recording medium manufacturing apparatus of the present invention, the first or second chamber is further provided with third deposition means disposed under the first or second cooling can, a second nitrogen-ion supply means for supplying nitrogen ions during the deposition by the third deposition means, a third oxygen-gas introduction means for introducing oxygen gas after the deposition by the third deposition means, and a means for demarcating deposition regions of the first or second deposition means and the third deposition means. The third deposition means, second nitrogen-ion supply means, and third oxygen-gas supply means are arranged in a chamber where a magnetic layer is formed.

(4) In another embodiment of a magnetic recording medium manufacturing apparatus of the present invention, the lubricant spray means in the third chamber includes an ultrasonic wave generator and a spray nozzle.

(5) In another embodiment of a magnetic recording medium manufacturing apparatus of the present invention, the third chamber is further provided with a means for heating a nonmagnetic support on which a lubricant is sprayed. A heating lamp is suitable as the means for heating the nonmagnetic support on which the lubricant is sprayed, and its installation position is not restricted as long as the nonmagnetic support on which the lubricant is sprayed can be heated. The heating lamp heats the support preferably at 80° to 100° C.

The manufacturing apparatus of the present invention makes it possible for form a back-coat layer, a magnetic layer, and a top-coat layer on the magnetic layer without transferring the tape to another vacuum deposition line or coating line, and thereby losing the vacuum to the atmospheric pressure. The apparatus is advantageously used for the third manufacturing method of the present invention. The manufacturing apparatus of the present invention has a very high productivity and makes it possible to prevent dust from adhering to the nonmagnetic support in the air.

Moreover, the present invention provides a magnetic recording medium having a back-coat layer with a surface resistance of from 5 to $10^5$ Ω, which is formed by depositing metal on the surface opposite to the magnetic layer deposition surface of the nonmagnetic support, while introducing oxygen. The magnetic recording medium can be manufactured by the above-mentioned first or third manufacturing method of the present invention and also by the manufacturing apparatus of the present invention.

The second manufacturing method using a semi-metal can be conducted with the above-shown second method and manufacturing apparatus. The recording medium using a semi-metal can be produced advantageously in a vacuum, and moreover is improved in view of the enveloping property, which provides the medium with a suitable extent of elasticity, due to the back-coat layer of a semi-metal, so that the reproducing head and the medium are in a good contact state with each other.

The invention also provides a magnetic recording medium having a back-coat layer containing carbon black, which has been deposited in a vacuum onto a nonmagnetic substrate, either before or after said nonmagnetic substrate has been provided with a magnetic layer.

EXAMPLES

The present invention will now be described in more detail with reference to the following examples, which should not be considered to limit the scope of the present invention.

Example 1

First, a layer of Co-Ni alloy (80%–20%) with a thickness of 1,500 Å is formed on a PET film with a thickness of 9.8 μm by means of vacuum deposition, and a magnetic tape on which a magnetic layer is thus formed is wound on a roll.

Then, a Al layer with a thickness of 1,000 Å is deposited on the back of the magnetic tape by using a vacuum evaporator, shown in FIG. 1, to form a back-coat layer.

The following is the description of the vacuum evaporator shown in FIG. 1.

A vacuum vessel 1 is evacuated by a turbo pump 2 and a rotary pump 3. A vacuum of $4 \times 10^{-5}$ Torr is obtained.

An unwinding roller 4 and a winding roller 5 are disposed in the vacuum vessel 1. A magnetic tape 6 runs along the bottom surface of a cooling can 7 until the tape is wound on the winding roller 5 after it is drawn from the unwinding roller 4.

A crucible 8, into which Al is put, made of MgO is placed under the cooling can 7.

An electron beam is emitted from an electron beam gun 9, located in a position diagonally above the Al in the crucible 8, to heat and evaporate Al.

A shielding plate 10 to limit the deposition range on the magnetic tape 6 is installed between the crucible 8 and the cooling can 7.

An oxygen introducing tube 11 leading from the outside to the inside of the vacuum vessel 1 is so provided at the end of the tube faces the deposition surface through the hole of the shielding plate 10. The quantity of oxygen to be introduced can be adjusted by a flow rate control valve (not illustrated).

Thus, the roll of magnetic tape on which the magnetic layer is formed is set to the unwinding roll 4 to transport the tape on the cooling can 7 with the back of the magnetic tape 6 outside. Al heated and evaporated by the electron beam gun 9 is deposited on the tape while introducing oxygen through the oxygen introducing tube 11. The electron beam gun has an output of 30 kW. Oxygen with a purity of 99.998% is introduced at a rate of 25 cc/min. Then, the magnetic tape 6 on which a back-coat layer is formed is wound on the winding roll 5.

Then, the magnetic tape is taken out into the air, slitted (cut) into 3 mm-wide tapes, and loaded into an 8 mm cassette to measure the number of dropouts and the surface resistance. Dropouts are counted with a dropout counter and a defect such that the output is decreased by 16 dB in 10 μs is judged to be a dropout.

As a comparative example, a tape is used which is fabricated as follows. A film on which a magnetic layer is formed like in Example 1 is coated with a back-coat layer of 0.5 μm thickness. The back-coat layer is of a coating material such that carbon powder is dispersed in a binder of a mixture of vinyl chloride and urethane at 1:1 mixture ratio. The carbon powder is a mixture of two kinds of carbon black, of 20 nm grain diameter and of 60 nm grain diameter, respectively, at a mixture ratio of 1:1. Then, the number of dropouts and the surface resistance of the back-coat layer are measured in a manner similar to that used in Example 1.

These measurement results are shown below.

|  | Number of dropouts per min | Surface resistance (Ω) |
| --- | --- | --- |
| Example 1 | 8 | $7 \times 10^2$ |
| Comparative Example | 11 | $5 \times 10^6$ |

From the above results, it is found that the present invention yields a product which has a number of dropouts which is approximately 30% lower than that of the comparative example, wherein a tape was prepared by a conventional method. This is because dust is prevented from attaching to the tape of the present invention because scratches and dust are prevented when the back-coat layer is applied in a vacuum, and the resistance value is thus improved.

The vacuum evaporator shown in FIG. 1 has been described as the one which is used only for deposition of the back-coat layer. However, it is also possible to deposit a back-coat layer on the back of the magnetic tape by first depositing Co-Ni alloy instead of Al, stopping the introduction of oxygen to perform vacuum deposition of a magnetic layer, thereafter setting the magnetic tape of the winding roller 5 on the unwinding roller 4, and then depositing the back-coat layer on the back of the tape as described before.

It is also possible to continuously perform vacuum deposition of the magnetic layer and back-coat layer by installing a continuous magnetic layer deposition section and a continuous back-coat layer deposition section in a line in the vacuum vessel.

Example 2

Another 8 mm cassette was produced and was tested in the same manner as shown in Example 1, except using Si for the back-coat layer. Results are:

| number of dropouts per min | surface resistance (Ω) |
| --- | --- |
| 7 | $7 \times 10^2$ |

The 8 mm cassette was tested in view of the enveloping property by installing it in an apparatus modified from a commercially available Hi8VTR, (or High Band 8 mm VTR, Sony) recording signals of 7 MHz and determining a reproducing output power with an output variation in one track defined by the following equation:

output variation (%)=B/A×100

A: the maximum output (V) in one track

B: the minimum output (V) in one track

The larger the results of this calculation, the smaller is the output variation and the better is the enveloping property. The result obtained is 80 percent, which should be taken as good.

Example 3

Figure 2:
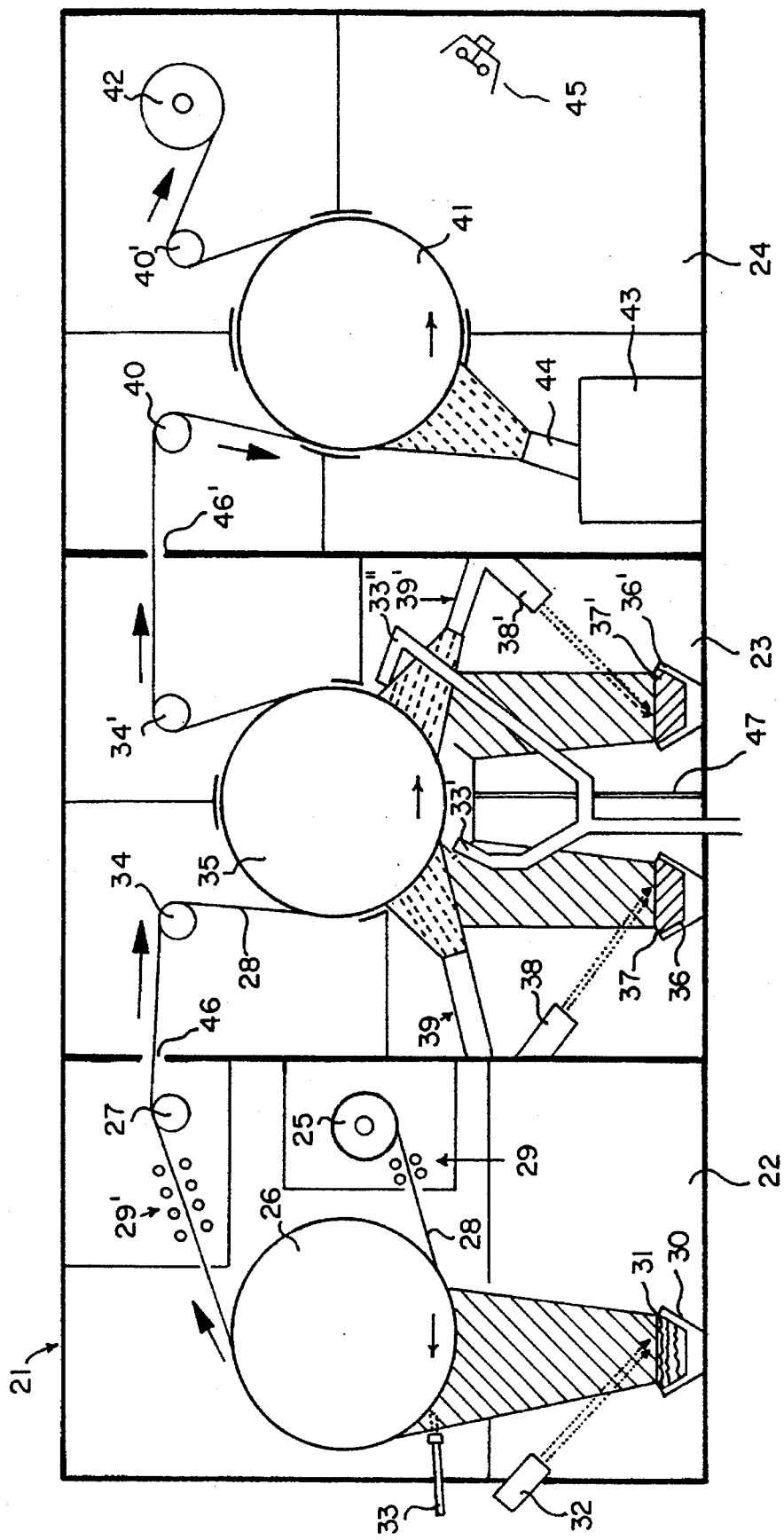
FIG. 2 is a schematic view of an example of the magnetic recording medium manufacturing apparatus of the present invention.

FIG. 2 is a schematic view of an example of a magnetic recording medium manufacturing apparatus of the present invention. In this apparatus, a back-coat layer is first formed, a magnetic layer is then formed, and a top-coat layer is finally formed.

A housing 21 is demarcated by a first chamber 22, a second chamber 23, and a third chamber 24. Each chamber is connected to vacuum means (not illustrated) so as to maintain a proper degree of vacuum. The appropriate degree of vacuum of each chamber is determined depending on the material to be attached. Therefore, it is possible for the chambers to have the same or different degrees of vacuum.

The first chamber 22 has an unwinding roll 25, a first cooling can 26 for transporting a nonmagnetic support 28, a feed roller 27, a first deposition means, and a first oxygen-gas introduction tube 33. Bombardment devices 28 and 29' are so installed that fine dust does not adhere to the nonmagnetic support coming out of the unwinding roller 25 and the nonmagnetic support going to the feed roller 27.

The first deposition means of the first chamber 22 comprises a crucible 30 and an electron gun 32 arranged under the first cooling can 26. The crucible 30 is open to a cooling can 26 and is charged with aluminum metal 31 for the back-coat layer in its recess. An electron beam is emitted from the electron gun 32 and applied to aluminum 31 in the crucible 30. Oxygen gas is introduced into the evaporation area of aluminum vapor through the first oxygen-gas introduction tube 33 to oxidize aluminum, and a thin film of aluminum oxide is formed as a back-coat layer. The quantity of oxygen to be introduced can be adjusted by a flow rate control valve (not illustrated).

The nonmagnetic support 28 on which the back-coat layer is formed is transported on the feed roller 27 and sent into the second chamber 23 through a slit 46, which is an opening for passing the nonmagnetic support.

The second chamber 28 has feed rollers 34 and 34' and a second cooling can 35 where the nonmagnetic support 28 travels. FIG. 2 shows an arrangement in which the second chamber is provided with both the second deposition means and a third deposition means.

The second deposition means comprises a crucible 36 and an electron gun 38 arranged under the second cooling can 35. The crucible 36 opens toward the second cooling can 35, and the metal iron 37 to serve as a magnetic layer is contained in its recess. An electron beam is emitted from the electron gun 38 and applied to the metal iron 37 in the crucible 36.

Nitrogen ions are supplied into the iron evaporation area by first nitrogen-gas supply means 39 to nitrify evaporated iron, and iron nitride adheres the nonmagnetic support and thereby a thin film of iron nitride is formed on the nonmagnetic support.

Then, oxygen gas is supplied through a second oxygen-gas introduction tube 33' after the deposition to oxidize the magnetic layer surface and its vicinity. In the second chamber, it is necessary to dispose the oxygen-gas introduction tube in a position where the magnetic layer surface can be oxidized immediately after iron nitride has adhered to the nonmagnetic support.

The third deposition means, in similar manner to the second deposition means, comprises a crucible 36' and an electron gun 38' arranged under the second cooling can 35. The crucible 36' opens toward the second cooling can 35, and iron metal 37' to serve as a magnetic layer is contained in its recess.

Nitrogen ions are supplied into the evaporation region of iron by a second nitrogen ion supply means 39', and evaporated iron is nitrogenized. Iron nitride adheres the nonmagnetic support to form a thin film of iron nitride on the support.

Then, oxygen gas is supplied through a third oxygen-gas introduction tube 33" after the deposition to oxidize the magnetic layer surface and its vicinity. In this arrangement, the second oxygen-gas introduction tube 33' and the third oxygen-gas introduction tube 33" constitute a branch tube leading to the source of oxygen gas.

The means for partitioning the areas of metallic vapor produced by the second and third deposition means is a shielding plate 47 which is normally made of metal.

In this apparatus, two magnetic layers are formed in which the corundum inclination directions differ from each other. The nonmagnetic support 28 on which the magnetic layers are formed is transported on the roller 34' and sent to the third chamber 24 through a slit 46'.

The third chamber 24 has feed rollers 40 and 40', a heating can 41 for transporting the nonmagnetic support 28, a winding roller 42, and lubricant spray means. In this case, the lubricant spray means comprises an ultrasonic atomizer 43 and a spray nozzle 44, which are arranged under the heating can 41 on the left of third chamber 24. A lubricant is atomized by ultrasonic waves and sprayed from the spray nozzle 44 on the nonmagnetic support 28 moving on the heating can 41 to form a top-coat layer on the magnetic layer. Moreover, in this arrangement, the third chamber has a heating lamp 45 to accelerate the drying of the lubricant sprayed on the nonmagnetic support.

Thus, the nonmagnetic support 28 on which the top-coat layer is formed is transported on the feed roller 40' and wound on the winding roller 42.

As described above, the present invention solves the problems present in the prior art, including attachment of air-borne dust, because a back-coat layer is formed through deposition in a vacuum.

Moreover, the present invention makes it possible to continuously form a back-coat layer, a magnetic layer and a top-coat layer of a magnetic recording medium of metallic-thin-film-type in a single line. Therefore, the productivity of said product is greatly improved.

Furthermore, though a back-coat layer formed only through a vacuum deposition has too smooth of a surface, and thus impairs the transport stability, the present invention makes it possible to maintain the transport stability by introducing oxygen for deposition, and thereby controlling the friction coefficient of the back-coat layer. The present invention also makes it possible not only to control the surface roughness, but to improve the corrosion resistance by introducing oxygen.

Furthermore, though generally the metallic bond is weakened, and the conductivity is decreased by the introduction of oxygen, the present invention makes it possible to prevent this decrease in the conductivity and to maintain the conductivity by determining the resistance and controlling the quantity of oxygen to be introduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A method of manufacturing a magnetic recording medium having a magnetic layer disposed on a non-magnetic substrate having a first and a second surface which comprises conducting the following steps in a housing having three chambers:

(a) applying a back coat layer comprising a metal having a surface resistance in the range of 5 to $10^5$ ohms or semi-metal having a surface resistance in the range of $10^5$ to $10^8$ ohms on a first surface of said non-magnetic substrate in a first chamber maintained in a vacuum;

(b) applying a magnetic layer on a second surface of said-non-magnetic substrate in a second chamber maintained in a vacuum; and (c) applying a top coat layer by ultrasonic spraying a lubricant on said magnetic layer in a third chamber maintained in a vacuum, to form said magnetic recording medium.

2. The method as claimed in claim 1, further comprising introducing an oxidizing gas during said providing of said back-coat layer comprising a metal or semi-metal.

3. The method as claimed in claim 1, wherein said back-coat layer comprises aluminum oxide.

4. The method as claimed in claim 1, wherein said applying of said top-coat layer by ultrasonic spraying comprises subjecting feeding means for feeding a lubricant and subjecting said lubricant fed from said feeding means to ultrasonic waves to atomize said lubricant, and spraying the resulting atomized lubricant on said magnetic layer.

5. The method as claimed in claim 1, wherein said magnetic layer comprises iron, a ferromagnetic alloy of iron, an iron nitride, an iron carbide, a nitride of a ferromagnetic alloy of iron, a carbide of a ferromagnetic alloy of iron, or mixtures thereof.

6. The method according to claim 1, wherein said vacuum in step (a) is $10^{-4}$ to $10^{-7}$ Torr.

7. The method according to claim 1, wherein said vacuum in step (b) is $10^{-4}$ to $10^{-7}$ Torr.

8. The method according to claim 1, wherein said vacuum in step (c) is $5\times10^{-1}$ to $5\times10^{-4}$ Torr.

9. The method according to claim 1, wherein said applying of said back coat layer in step (a) is by vacuum deposition.

10. The method according to claim 1, wherein said applying of said magnetic layer in step (b) is by vacuum deposition.

11. The method according to claim 1, wherein said back coat layer is applied to a thickness of 0.2 to 1.0 μm.

12. The method according to claim 1, wherein said back coat layer comprises a semi-metal and is applied to exhibit a surface resistance in the range of $10^5$ to $10^8$ ohms.

13. The method according to claim 1, wherein said back coat layer comprises a metal and is applied to exhibit a surface resistance in the range of from 5 to $10^5$ ohms.

14. The method according to claim 1, wherein said top coat layer is applied to a thickness of 50 to 200 Å.

15. The method according to claim 1, wherein said magnetic layer is a single layer structure.

16. The method according to claim 1, wherein said magnetic layer is a multiple layer structure.

17. The method as claimed in claim 4, wherein said lubricant is a fluorine-containing lubricant.

18. The method according to claim 4, wherein said ultrasonic waves are selected from a range of 20 kHz to 10 mHz.

* * * * *